US012551080B2

(12) United States Patent
Turner

(10) Patent No.: US 12,551,080 B2
(45) Date of Patent: Feb. 17, 2026

(54) CLEANING ASSEMBLY AND A METHOD OF CLEANING

(71) Applicant: John Thomas Turner, High Disley (GB)

(72) Inventor: John Thomas Turner, High Disley (GB)

(73) Assignee: John Thomas Turner, High Disley (GB)

( * ) Notice: Subject to any disclaimer, the term of this patent is extended or adjusted under 35 U.S.C. 154(b) by 0 days.

(21) Appl. No.: 18/555,624

(22) PCT Filed: Apr. 13, 2022

(86) PCT No.: PCT/GB2022/050930
§ 371 (c)(1),
(2) Date: Oct. 16, 2023

(87) PCT Pub. No.: WO2022/219334
PCT Pub. Date: Oct. 20, 2022

(65) Prior Publication Data
US 2024/0206697 A1 Jun. 27, 2024

(30) Foreign Application Priority Data
Apr. 15, 2021 (GB) ...................................... 2105399

(51) Int. Cl.
*A47L 13/58* (2006.01)
*A47L 13/20* (2006.01)
*B01D 37/00* (2006.01)

(52) U.S. Cl.
CPC ............... *A47L 13/58* (2013.01); *A47L 13/20* (2013.01); *B01D 37/00* (2013.01)

(58) Field of Classification Search
None
See application file for complete search history.

(56) References Cited

U.S. PATENT DOCUMENTS 3,630,369 A * 12/1971 Nichols .................. A47L 13/58 15/264
6,279,195 B1 8/2001 Biggs
(Continued)

FOREIGN PATENT DOCUMENTS

CN 201337422 Y 11/2009
CN 204484018 U 7/2015
(Continued)

OTHER PUBLICATIONS

Translation of CN 107456181A (Year: 2025).*
(Continued)

*Primary Examiner* — Eric W Golightly
(74) *Attorney, Agent, or Firm* — Michael Best & Friedrich LLP

(57) ABSTRACT

Described is a cleaning assembly 11, such as a mop bucket, for use with a cleaning liquid. The cleaning assembly comprises a drying mechanism 12; a collecting receptacle 13, for receipt of the cleaning liquid, fluidly connected to the drying mechanism 12; and a rinsing receptacle 14, also for receipt of the cleaning liquid, fluidly connected to the collecting receptacle 13 via a filter 15, wherein the collecting receptacle 13 is positioned relative to the rinsing receptacle 14 so as to promote flow of the cleaning liquid from the collecting receptacle 13 to the rinsing receptacle 14 through the filter 15. A method of cleaning using the cleaning assembly is also described.

19 Claims, 7 Drawing Sheets

(56) References Cited

U.S. PATENT DOCUMENTS

| | | | |
|---|---|---|---|
| 2002/0116781 A1 | 8/2002 | Williams et al. | |
| 2005/0262656 A1* | 12/2005 | Van Landingham, Jr. | A47L 13/59 15/261 |
| 2011/0099745 A1 | 5/2011 | Van Landingham, Jr. et al. | |
| 2011/0203613 A1* | 8/2011 | Roberts | A47L 13/58 134/10 |
| 2012/0241389 A1 | 9/2012 | Van Landingham, Jr. et al. | |
| 2014/0263104 A1* | 9/2014 | Kepner | A47L 13/58 210/791 |
| 2017/0231457 A1 | 8/2017 | Cloud | |

FOREIGN PATENT DOCUMENTS

| | | | | |
|---|---|---|---|---|
| CN | 107456181 A | * | 12/2017 | A47L 13/256 |
| CN | 104605798 B | | 5/2018 | |
| CN | 208598315 U | | 3/2019 | |
| CN | 208822691 U | | 5/2019 | |
| CN | 110037629 A | | 7/2019 | |
| CN | 211674077 U | | 10/2020 | |
| CN | 111904349 A | | 11/2020 | |
| DE | 102008013797 A1 | | 9/2009 | |
| EP | 2449941 A2 | | 5/2012 | |
| ES | 1049847 U | | 2/2002 | |
| GB | 2260691 A | | 4/1993 | |
| WO | 2017143135 A1 | | 8/2017 | |

OTHER PUBLICATIONS

United Kingdom Intellectual Property Office Search Report for Application No. GB2105399.6 dated Oct. 4, 2021 (2 pages).

International Search Report and Written Opinion for for Application PCT/GB2022/050930 dated Jul. 7, 2022 (24 pages).

International Preliminary Report on Patentability for Application No. PCT/GB2022/050930, dated Oct. 12, 2023 (8 pages).

* cited by examiner

Prior Art

Prior Art

CLEANING ASSEMBLY AND A METHOD OF CLEANING

The present application is a U.S. National Phase Application of PCT/GB2022/050930, filed Apr. 13, 2022, which claims priority to Great Britain Application No. 2105399.6, the entire contents of both of which are herein incorporated by reference.

FIELD OF THE INVENTION

The present invention relates to a cleaning assembly for use with a cleaning liquid. The present invention also relates to a method of cleaning using the cleaning assembly, especially to a method of cleaning a surface, such as a floor. It will be appreciated that one (non-limiting) example of such a cleaning assembly is an improved mop bucket.

BACKGROUND OF THE INVENTION

A well-known cleaning assembly is a mop bucket, which is generally used for retaining a cleaning liquid or fluid, e.g. water, for use when mopping a surface, typically a floor. Traditionally, mop buckets were made in galvanised sheet metal, with a dished and perforated plate (herein referred to as a wringer) at one end to allow the user to squeeze the mop head dry, after rinsing it in the cleaning liquid to remove any detritus, including solid particles such as sand and grit, hair and fur, flakes of skin, and fragments of food. Variants of these mop buckets are still widely used today, although most often manufactured in plastic, typically, by injection moulding.

More recently, a number of different bucket shapes have appeared on the market, varying from the circular in cross-section (when viewed from above) to the elongated circular (or quasi-elliptical). Despite their changed appearance, these newer assemblies tend not to offer anything more sophisticated than a bucket with a single compartment/receptacle for the cleaning liquid and a separate drying mechanism for wringing, spinning, or squeezing the mop head. As shown in FIG. 1, during step 'A' of the mopping operation, a user first immerses a mop head into the receptacle containing cleaning liquid to wet and then rinses the mop head. In step 'B', the mop head is partially dried using the drying mechanism. In step 'C', the partially dried mop head is placed on the floor and moved around to clean the surface, with the aim of collecting any detritus, together with smeared substances such as grease, on the tendrils of the mop head. The contaminated mop head is then re-immersed in liquid, by repetition of step 'A', where it is agitated to remove at least some of the debris collected during step 'C'. By repetition of step 'B', the mop head is partially dried in the drying mechanism before being returned to the floor for repetition of step 'C'. The whole cycle is repeated as many times as is required until the entire surface in question has been cleaned to an acceptable level.

An inevitable consequence of the procedure described above is that the cleaning liquid in the bucket, although initially clean, becomes increasingly contaminated as mopping continues. Although large and dense particles may have sufficient time to settle to the bottom of the bucket before the mop head is re-immersed during the next washing cycle, the smaller particles are effectively held in permanent suspension in the liquid, because of their low settling velocities (which are typically much less than 1 mm/s). The small particles therefore tend to spread uniformly throughout the liquid receptacle, their concentration remaining sensibly constant during the intervals between successive immersions of the mop head. Large particles may also be re-entrained and dispersed throughout the liquid whenever the mop head is agitated during rinsing. The repeated immersion of the mop head in this increasingly 'dirty' liquid (i.e. liquid that will probably contain various forms of solid and dissolved detritus) ensures that recontamination of the floor during the mopping process is bound to occur.

Recontamination of the surface is particularly undesirable where high standards of cleanliness are needed, for example, in hospitals and schools, or in other large public areas such as occur in airports or hotel entrances. Severe outbreaks of the MRSA virus in hospitals in recent years and, even more recently, the on-going impact of the Covid-19 pandemic only serve to emphasise the importance of these cleaning operations in situations where disease control is at its most critical. However, although it may be obvious, it also needs to be stated that such recontamination is highly undesirable in domestic environments.

The user may try to overcome the issue of recontamination by regularly changing the cleaning liquid in the mop bucket. However, this takes time and requires the introduction of new cleaning liquid (including potentially costly chemicals) at frequent intervals. In situations involving extensive floor areas, a typical user may have neither the patience, nor the ability, to change the cleaning liquid with the frequency needed to maintain an adequate level of cleaning.

Several modifications to the traditional mopping assemblies have been previously described and implemented. One particular example is the Vileda 'Turbo Spin Mop and Bucket Set', which includes a bucket with a single compartment and a mechanically driven cyclone separator to spin-dry the mop head after each rinsing operation, i.e. a spinning mechanism which imparts a cyclonic motion to the mop head, in contrast to the squeezing or wringing mechanisms used by other systems/manufacturers. The user places the mop head in the cyclone (or spinner) and uses a foot pedal on the outside of the bucket to operate the cyclone mechanism. The liquid extracted from the mop head is expelled through the slatted sides of the cyclone, before flowing radially outwards, then downwards into the bucket below. Despite the modifications made, this assembly retains the limitation shared by all single compartment buckets, namely no attempt has been made to minimise contamination of the cleaning liquid by the mop head as the mopping operation continues.

Larger cleaning assemblies with multiple buckets carried on a wheeled cart, referred to henceforth as commercial systems, also exist, although even these assemblies ultimately result in similar contamination issues of the cleaning liquid. However, these systems are large, costly, and too unwieldly for normal domestic use where weight and operational convenience are important factors. To ensure that improvements to traditional designs of mop bucket are accepted by domestic users, it is essential that any increase in the overall weight and, particularly, the operational complexity are kept to the absolute minimum.

It is therefore an object of the present invention to obviate, or at least to mitigate, one or more disadvantages of current cleaning assemblies, whether identified herein or otherwise.

SUMMARY OF THE INVENTION

In a first aspect of the present invention there is provided a cleaning assembly, for use with a cleaning liquid, comprising: a drying mechanism; a collecting receptacle, for receipt of the cleaning liquid, fluidly connected to the drying mechanism; and a rinsing receptacle, also for receipt of the cleaning liquid, fluidly connected to the collecting receptacle via a filter, wherein the collecting receptacle is positioned relative to the rinsing receptacle so as to promote flow of the cleaning liquid from the collecting receptacle to the rinsing receptacle through the filter.

The term "receptacle" is intended to indicate any form of vessel or compartment capable of holding a volume of liquid. While the term "receptacle" has been used, other alternative terms are also contemplated e.g. buckets, reservoirs, volumes, compartments and containers. The receptacles may be entirely separate receptacles or they may be individual compartments formed by division of the space within a larger receptacle.

The term "cleaning liquid" is intended to indicate any fluid suitable for cleaning a surface, object or area. For example, the cleaning liquid may be water or water comprising a cleaning agent, such as soap, disinfectant and/or bleach.

The cleaning assembly, e.g. a mop bucket assembly, according to the first aspect of the invention contains two (or more) receptacles, and relies on the flow of liquid through one or more filters located between the receptacles to remove particulates or other contaminants that would otherwise continue to accumulate in the liquid contained within the assembly. This allows the user to reduce recontamination of the surface during cleaning using the cleaning assembly. Whilst the cleaning assembly of the present invention is primarily aimed at use in domestic applications, it will be appreciated that the assembly could also find application in commercial settings, for example, in the large-scale floor cleaning operations, which are required in public buildings, supermarkets and airport terminals.

Advantageously, the invention minimises recontamination of a surface during cleaning and reduces the number of times the receptacles need to be refilled with clean liquid when cleaning large areas.

It will be apparent that the cleaning assembly of the present invention can be used in conjunction with a cleaning implement comprising a wettable cleaning head (e.g. a mop head) to remove particulate material from a surface (e.g. a floor). When used herein the term "particulate" refers to all the detritus that can be collected during a floor cleaning/mopping exercise including solid particles such as sand and grit, hair and fur, flakes of skin, and fragments of food.

The cleaning assembly may further comprise one or more intermediate rinsing receptacles fluidly connected between the collecting receptacle and the (final) rinsing receptacle, whereby the intermediate rinsing receptacles may be fluidly connected, preferably sequentially if two or more intermediate rinsing receptacles are present, to the collecting receptacle via the filter (hereby referred to as the first filter) and may be fluidly connected to the final rinsing receptacle, optionally via a second filter. As described herein, the inclusion of the intermediate rinsing receptacle(s) and the second filter may improve the performance of the cleaning assembly in removing particulates from a cleaning implement and the cleaning liquid and thus may further reduce recontamination of a cleaning surface.

For the avoidance of any doubt, when the cleaning assembly contains two receptacles, it comprises a collecting receptacle and a rinsing receptacle. When the cleaning assembly contains three receptacles, it comprises a collecting receptacle, an intermediate rinsing receptacle and a final rinsing receptacle. The intermediate receptacle would be arranged in between the collecting receptacle and the final rinsing receptacle. When the cleaning assembly contains four receptacles, it comprises a collecting receptacle, a first intermediate rinsing receptacle, a second intermediate rinsing receptacle and a final rinsing receptacle.

Preferably, the cleaning assembly comprises a single intermediate rinsing receptacle and therefore comprises a collecting receptacle, an intermediate rinsing receptacle and a final rinsing receptacle.

Fluid connection of two receptacles (e.g. the collecting receptacle and the final rinsing receptacle, the collecting receptacle and the intermediate rinsing receptacle, or the intermediate rinsing receptacle and the final rinsing receptacle) may be achieved by means of a channel containing the filter (e.g. the first or second filter).

Preferably, the cleaning assembly may further comprise a pumping mechanism for pumping the cleaning liquid from the (final) rinsing receptacle to the collecting receptacle, thereby enabling circulating liquid flow within the assembly.

The pumped cleaning liquid may flow through a dedicated channel (e.g. the cleaning fluid may be pumped via a separate fluid connection to the connections described above). Beneficially, the dedicated channel may contain a filter, hereby referred to as the third filter.

Alternatively, the pumping mechanism may pump the cleaning liquid from the final rinsing receptacle to the intermediate rinsing receptacle to enable the circulating liquid flow within the assembly. Again, the pumped cleaning liquid may flow through a dedicated channel that may, optionally, contain a third filter.

The creation of a circulating liquid flow in the assembly is particularly desirable because it causes the cleaning liquid to pass repeatedly through the filters (e.g. the first, second and third filters), leading to significantly increased removal of the particulates contained within the cleaning liquid. Successive passage of the fluid through the filters will also ensure that the cleaning assembly is "self-correcting", i.e. if the user fails to follow recommended mop head cleaning procedures, the resultant contamination of the water in the final rinsing receptacle, containing the cleanest liquid, will eventually be removed.

The pumping mechanism may be driven by an electric motor. This would allow the cleaning liquid to be circulated between the receptacles without any physical input from the user. The pumping action and consequent recirculation through the filters can then continue while the user is otherwise engaged or proceeding with the mopping operation. Conveniently, the electric motor can be activated by one or more liquid level switches, allowing pumping to occur whenever the liquid in one or more of the receptacles rises or falls relative to a predetermined level. This will ensure that a suitable depth of liquid is always retained within each receptacle. Preferably, the electric motor may run from a rechargeable battery.

Alternatively, the pumping mechanism may be configured to be driven by a foot pedal, which would allow the user to produce a circulating liquid flow themselves without the need for a separate electric motor. This may also provide the user with more control.

The drying mechanism of the cleaning mechanism may be a wringer (i.e. a dished and perforated plate), such as is known in the art. Preferably, the drying mechanism may involve moving components that are externally driven or powered. For example, the drying mechanism may comprise a spinner. Most preferably, the drying mechanism, e.g. the spinner, may be configured to be driven by a foot pedal. A driven or powered drying mechanism may aid the user in removing liquid from a cleaning head of a cleaning implement, resulting in greater liquid removal and/or reduced effort by the user.

Advantageously, the foot pedal that may be configured to drive the pumping mechanism may also be configured to drive the drying mechanism (e.g. a spinner). This would allow the user to dry (e.g. spin) the cleaning head of the cleaning implement to reduce liquid content while also pumping liquid to generate a circulating liquid flow. The benefits of both a driven or powered drying mechanism and the circulating liquid flow would therefore be achieved via one action of the user. It would also make it simpler for the user to operate the system.

At least some of the filters incorporated in the cleaning assembly may be removable, allowing them to be removed from the cleaning assembly and washed to remove at least some of the particulate matter that has been collected.

Preferably, the filter(s) of the cleaning assembly will all be housed in a single filter block. The filter(s) and/or the filter block may be removable from the cleaning assembly. In preferred arrangements, for example where the collecting, intermediate rinsing and final rinsing receptacles are positioned in a triangular array, the filter block can be located centrally. Furthermore, the filter block may comprise internal ducts to direct the flow of cleaning liquid between receptacles. A removable filter block would allow the filters to be accessed easily for cleaning purposes. Cleaning will be improved still further if the individual filters can all be removed from the filter block for immersion under a tap.

The filter block may also comprise location slots (or housings) for the filters. The housings are preferably leak-proof. This will ensure that they are correctly returned to the filter block once cleaning has occurred.

Preferably, the cleaning assembly comprises filters with different porosities or different grades. Further preferably, the filter located prior to the final rinsing receptacle has the lowest porosity and will filter out at least some, if not the majority, of the smallest sized particles.

The relative positioning of the receptacles in the present invention may be such that at least some of the cleaning liquid remains in all receptacles. Alternatively, the relative positioning of the receptacles may be such that at least some of the cleaning liquid remains in only the intermediate rinsing and final rinsing receptacles.

The cleaning assembly may further comprise one or more valves configured to restrict the flow of cleaning liquid between the collecting receptacle and the final rinsing receptacle. These valve(s) can be simple sliding plate valves, although other valves may offer greater sensitivity and control. The restriction of flow between the receptacles may allow for a sufficient depth of liquid to be retained in each receptacle, thereby ensuring that there is an ample depth for the cleaning head of the cleaning implement to be fully immersed while being rinsed clean. The use of a valve(s) may also allow different users to choose their preferred liquid levels in each receptacle.

The cleaning assembly may further comprise a digital control system configured to monitor the pressure drop across each filter and/or signals from one or more liquid level indicators. Preferably, the control system is also configured to adjust/position the valves. By this means, it may be possible to maximise the recirculation rates, adjust the water depths in each receptacle and optimise the cleaning performance.

Advantageously, the valve(s) may be located in the filter block.

The filter, or at least one of the filters, may be a specialised filter. For example, the filter(s) may be selected from a membrane filter, a charcoal filter, a biological filter, or a combination of one or more of these. Any other such specialised filters may also be used. Such filters may address issues of removal of contaminants, which are soluble in water, such as grease or chemicals, and can be used to capture the smallest particles such as bacteria and pathogens, which typically have sizes in the sub-micron range. In addition, membrane filters can be targeted to remove specific molecular compounds e.g. the bacteria that cause milk to turn sour.

The collecting receptacle may be at least partially arranged at a greater height than the final rinsing receptacle when the assembly is considered in a vertical orientation of normal use. In assemblies comprising three receptacles, the collecting receptacle may be at least partially arranged at a greater height than the intermediate rinsing receptacle, and the intermediate rinsing receptacle may be at least partially arranged at a greater height than the final rinsing receptacle, all when the assembly is considered in a vertical orientation of normal use. Such an arrangement would allow hydrostatic head differences in the levels of the cleaning liquid in each of the receptacles to be used to promote the flow of liquid from the collecting receptacle to the final rinsing receptacle.

Beneficially, the cleaning assembly may further comprise a separate cleaning implement, for example a mop, comprising a cleaning head, for example a mop head, configured to fit into each of the receptacles and into or onto the drying mechanism. The cleaning assembly of the invention includes two or more receptacles, with three receptacles being preferred. It will be appreciated that should these all remain the size of typical mop bucket receptacles, then the cleaning assembly would be significantly larger and heavier than traditional mop buckets. However, it is likely that for this cleaning assembly to be accepted in the domestic market, any increases in the overall weight and, particularly, the operational complexity must be kept to a minimum. By including a separate cleaning implement configured to fit within the receptacles of reduced size, it may be possible to produce a cleaning assembly that closely matches the overall size (and filled weight) of mopping assemblies currently available on the domestic market.

Furthermore, the cleaning head of the cleaning implement may be configured to rotate independently of the rest of the cleaning implement. This would allow the cleaning head to be spun in a spinner while the cleaning implement is otherwise held by the user.

Preferably, the drying mechanism is positioned so as to be in register with the collecting receptacle in a vertical orientation. The drying mechanism may be located at the top of (i.e. stacked on), or contained within, the collecting receptacle. The drying mechanism and the collecting receptacle may be integrated as a single component, which could be easily achieved by enclosing a known drying mechanism. This would save space and reduce the size and complexity of the cleaning assembly. Advantageously, a filter may also be provided between the drying mechanism and the collecting receptacle. For example, one design solution would be for a filter to be placed around the outside of the drying system.

It will also be appreciated that, when the drying mechanism is positioned to be in register with the collecting receptacle in a vertical orientation, pumping of cleaning liquid from the (final) rinsing receptacle to the collecting receptacle could involve cleaning fluid being pumped to either above or below the drying mechanism (with the latter being preferred).

The cleaning assembly may further comprise markings or other indicia to indicate to a user the optimal order of use of each of the receptacles comprised therein, i.e. which receptacle the cleaning implement (such as a mop head) should be inserted into firstly, then secondly, then thirdly, etc. Markings or other indicia on the cleaning assembly, such as colour coding or clear messaging, should ensure that the user follows the correct sequence when rinsing, washing and drying (e.g. by wringing) the cleaning head.

Preferably, the receptacles of the cleaning assembly may be provided as separate compartments within a single overall container (e.g. a bucket).

The cleaning assembly and/or the filter block may be made out of plastic such as Polyethylene Terephthalate (PET), High Density Polyethylene (HDPE), Polyvinyl Chloride (PVC), Polypropylene (PP), Polylactic Acid (PLA) or Acrylonitrile Butadiene Styrene (ABS). Preferably, the cleaning assembly and/or the filter block will be produced using Acrylonitrile Butadiene Styrene, which is both rigid and durable, and can be attractively coloured.

The cleaning assembly and/or the filter block may be manufactured by injection moulding, blow moulding, compression moulding, thermoforming, or any other suitable forming technique known in the art.

When a design incorporating three receptacles/compartments is chosen, it will be most convenient for the receptacles to be arranged as a triangular array, when viewed from above. This will provide the greatest stability and reduce the chances of accidental spillage when compared to other bucket designs.

The inclusion of multiple intermediate receptacles, and further filters located in-between the intermediate receptacles, will likely lead to further gains in cleaning performance. A cleaning assembly according to the invention may therefore comprise four or more receptacles. While the added weight and complexity of the assembly might make it more suitable for commercial applications, it would likely lead to a yet further increase in the removal of particulates from the cleaning liquid, which could be beneficial for specialised applications. Incorporation of a membrane filter, a charcoal filter, and/or a biological filter as the filter(s) in the assembly is also particularly advantageous in these specialised applications.

In any configuration of the cleaning assembly, incorporation of wheels, castors, rollers or any such other movement means to the base of the assembly would allow the assembly to be moved around more easily.

According to a second aspect of the invention there is provided a method of cleaning using the cleaning assembly of the first aspect of the invention. The method comprises the steps of:

(i) providing a cleaning implement, comprising a cleaning head, for use with the cleaning assembly;
(ii) adding a cleaning liquid to at least one of the receptacles of the cleaning assembly;
(iii) immersing the cleaning head of the cleaning implement in the cleaning liquid in the rinsing receptacle;
(iv) removing at least some of the cleaning liquid wetted into/onto the cleaning head using the drying mechanism;
(v) cleaning a surface with the cleaning head; and
(vi) repeating the steps (iii) to (v) until satisfactory cleaning of the surface has been achieved.

When the cleaning assembly comprises three receptacles, the method comprises the steps of:

(i) providing a cleaning implement, comprising a cleaning head, for use with the cleaning assembly;
(ii) adding a cleaning liquid to at least one of the receptacles of the cleaning assembly;
(iii) immersing the cleaning head of the cleaning implement in the cleaning liquid in the final rinsing receptacle;
(iv) removing at least some of the cleaning liquid wetted onto/into the cleaning head using the drying mechanism;
(v) cleaning a surface with the cleaning head;
(vi) immersing the cleaning head of the cleaning implement in the cleaning liquid in the intermediate rinsing receptacle;
(vii) removing at least some of the cleaning liquid wetted into/onto the cleaning head using the drying mechanism; and
(viii) repeating the steps (iii) to (vii) until satisfactory cleaning of the surface has been achieved.

In other words, for a system with three receptacles, the method is essentially the same as with a cleaning assembly comprising two receptacles, except that, after step (v), the cleaning head of the cleaning implement would not be immediately immersed in the cleaning liquid in the final rinsing receptacle. Instead, the cleaning head would be immersed in the cleaning liquid in the intermediate rinsing receptacle (step (vi)) and then at least some of the cleaning liquid wetted into/onto the cleaning head will be removed (step (vii)).

This embodiment may ensure that a contaminated cleaning head (i.e. contaminated from cleaning the surface) is initially rinsed in the intermediate rinsing receptacle before conducting a second rinse in the final rinsing receptacle. This may allow for the final rinsing receptacle to remain relatively non-contaminated and lead to improved removal of particles from the cleaning head. This may reduce recontamination of the surface.

It will be appreciated that the very first immersion of the cleaning head (i.e. the first time step (iii) is conducted), so as to wet the cleaning head, could instead involve immersing the cleaning head of the cleaning implement in the cleaning liquid in the intermediate rinsing receptacle (i.e. instead of the final rinsing receptacle). With fresh cleaning liquid, it would not matter which of the intermediate rinsing receptacle and the final rinsing receptacle was chosen to initially wet the cleaning head.

It will also be appreciated that after the surface has been satisfactorily cleaned, i.e. the last time step (v) is conducted, the final rinsing in the steps (vi) and (vii) of the cleaning head may be omitted.

When the cleaning assembly comprises a pumping mechanism configured to be driven by a foot pedal, either of the methods above may further comprise the step of applying pressure to the foot pedal to enable liquid to be circulated within the assembly. This would allow the user to initiate the circulating liquid flow within the cleaning assembly at some desired point in the operational procedure. The circulating flow could then be created and repeated as often as the user feels is necessary.

When the foot pedal is configured to drive both the drying mechanism and the pumping mechanism, beneficially the aforementioned step would be included as part of step (iv) and, for a three receptacle cleaning assembly, step (vii).

DESCRIPTION OF FIGURES

The present invention will now be described with reference to the following non-limiting examples and figures, in which.

DETAILED DESCRIPTION OF THE INVENTION

Two Receptacle Assembly

Figure 1:
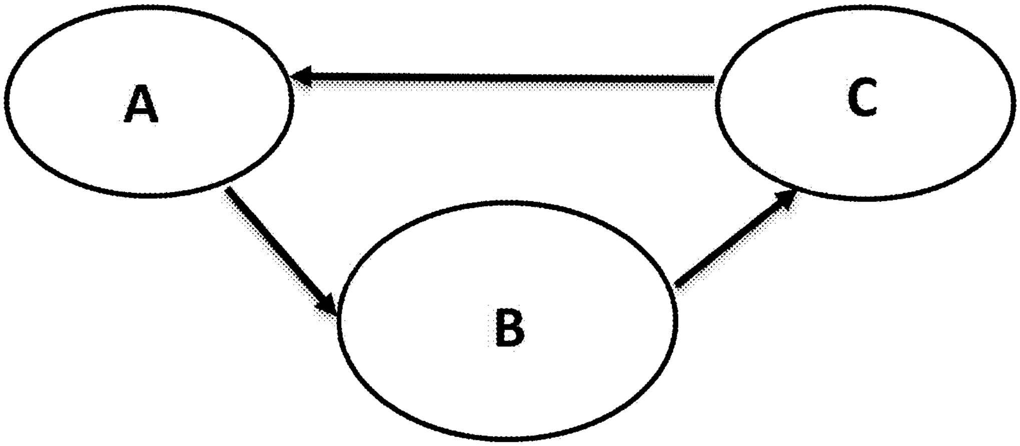
FIG. 1 is a schematic showing the basic operation of a traditional, prior art mopping assembly.
Figure 2:
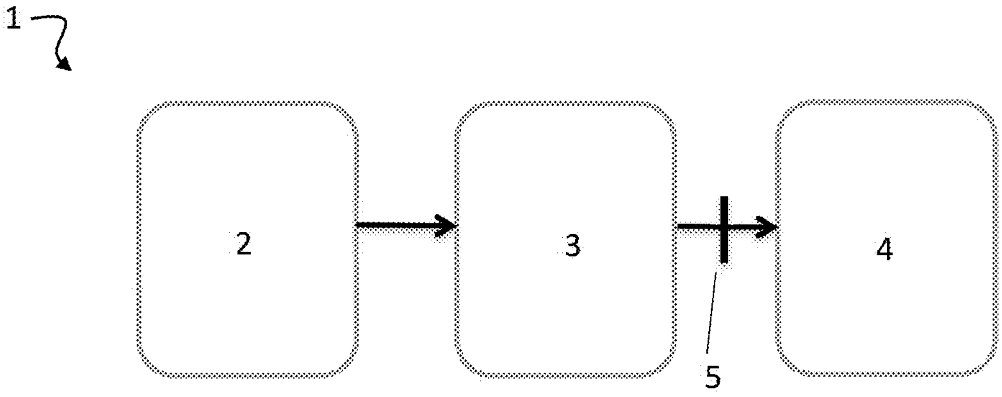
FIG. 2 is a schematic illustrating an embodiment of the cleaning assembly of the present invention comprising two receptacles.
Figure 3:
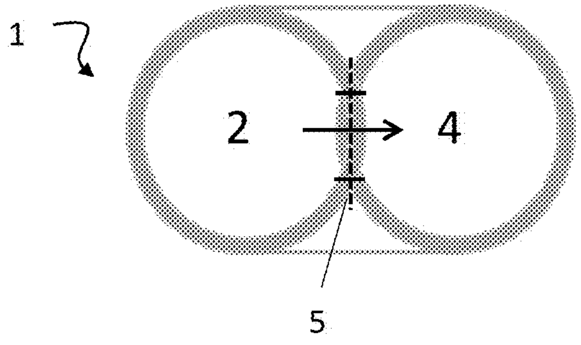
FIG. 3 is a schematic illustrating a top view of an embodiment of the cleaning assembly of the present invention comprising two receptacles where the drying mechanism and the collecting receptacle are integrated as a single component.

Referring to FIGS. 2 and 3, there is depicted a cleaning assembly 1, in the form of a mop bucket, according to an embodiment of the present invention. The cleaning assembly 1 includes a drying mechanism 2, a collecting receptacle 3, a final rinsing receptacle 4, and a filter 5.

In FIG. 2, the drying mechanism 2 of cleaning assembly 1 allows for removal of either clean or contaminated liquid (e.g. water) from a cleaning implement (not shown), such as a mop, comprising a wettable cleaning head (e.g. a mop head). The drying mechanism wrings, spins and/or squeezes the cleaning head of the cleaning implement in order to reduce the amount of liquid retained by it. The drying mechanism is actuated by suitable means know in the art, such as the user manually pressing the cleaning head against a wringer or a foot pump or pedal driving a movement of a spinner. The drying mechanism is fluidly connected to the collecting receptacle 3. The drying mechanism 2 may be positioned directly over the collecting receptacle 3 or may otherwise be integrated with the collecting receptacle 3, as shown in FIG. 3.

The collecting receptacle 3 is connected to the rinsing receptacle 4 via a channel (not shown) containing filter 5. The two receptacles are arranged such that liquid can flow from the collecting receptacle 3 to the rinsing receptacle 4. Small differences in the levels of the free surfaces of the cleaning liquid in the collecting and rinsing receptacles (conventionally known as "hydrostatic head differences") will be capable of producing the flow between the receptacles. Filter 5 is positioned such that it is capable of removing at least some, preferably most, particulate material from the liquid that flows from the collecting receptacle to the rinsing receptacle, resulting in removal of at least some of the contaminants present in the liquid.

In example operation, a user would begin by adding cleaning liquid to the assembly. This may be, for example, water or water comprising a cleaning agent, such as soap, disinfectant and/or bleach. The user would then insert the cleaning head of a cleaning implement into the rinsing receptacle 4 in order to conduct an initial rinse or, at least, to wet the cleaning head with the cleaning liquid. The cleaning head would then have at least some of the liquid wetted into/onto it removed, i.e. it would be partially dried, using drying mechanism 2 (e.g. the cleaning head would be spun, wrung or squeezed). Liquid removed from the wetted cleaning head would flow into the collecting receptacle 3. The user would then clean, e.g. mop, their desired surface (e.g. a floor) using the cleaning implement.

During this initial cleaning/mopping, and subsequent cleaning/mopping, the cleaning head would likely become contaminated, and would therefore need to be cleaned, i.e. to have at least some of the contamination removed. The cleaning head would therefore be returned to the rinsing receptacle 4, where it would be rinsed, e.g. by dunking, and agitated by the user to remove at least some, preferably most of, the contaminant matter present on/in the cleaning head. The cleaning head would then again be partially dried using drying mechanism 2 before its continued use in cleaning the user's desired surface. Liquid removed from the cleaning head via drying mechanism 2 would be captured by the collecting receptacle 3, and would flow from the collecting receptacle 3 to the rinsing receptacle 4 via filter 5. Introduction of this filtered cleaning liquid into the rinsing receptacle 4 results in a reduced level of contamination therein compared to mopping assemblies containing a single receptacle and no filtration system.

Figure 4:
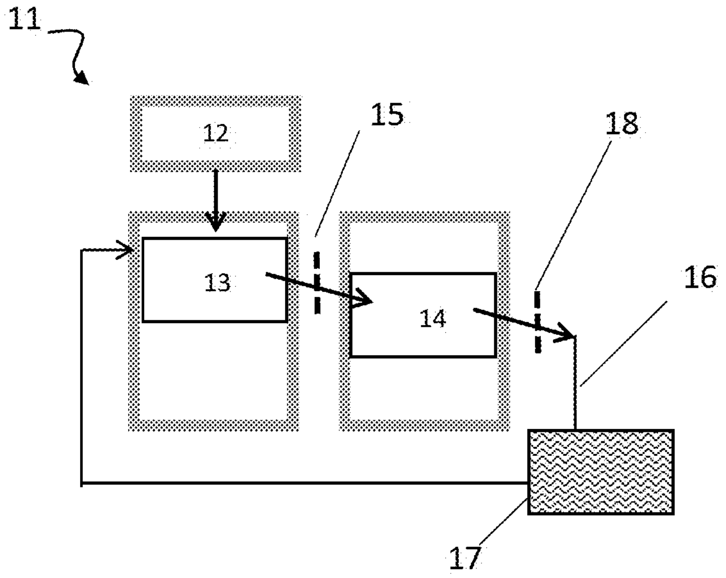
FIG. 4 is a schematic illustrating the liquid flow in an embodiment of the cleaning assembly of the present invention comprising two receptacles that enable the creation of a circulating liquid flow.

FIG. 4 shows a preferred embodiment of the present invention where there is a circulating liquid flow within a cleaning assembly 11, in the form of a mop bucket, comprising drying mechanism 12, a collecting receptacle 13, a rinsing receptacle 14, filters 15 and 18, a pumping channel 16, a pump 17. The drying mechanism 12, collecting receptacle 13, a rinsing receptacle 14, filter 15 are as described for the embodiment shown in FIG. 2.

A circulating flow of liquid is achieved by pumping the liquid from the rinsing receptacle 14 to the collecting receptacle 13 using a mechanical pump 17. Specifically, the liquid is pumped along channel 16 containing filter 18. Filter 18 is positioned such that it is capable of removing at least some, preferably most, of the particulate material from the liquid that flows from the rinsing receptacle 14 to the collecting receptacle 13, resulting in removal of contaminants present in the liquid. The pumping mechanism may be driven by a foot pedal, or lever. It may be the same mechanism used to drive the drying mechanism. In alternative embodiments (not shown) the pump may be may be driven by an electric motor that is activated by a digital control system in response to signals derived from one or more liquid level switches or differential pressure transducers.

In FIG. 4, the relative position of the first and rinsing receptacles shows how differences in the levels of the free surfaces of the cleaning liquid can be achieved by positioning the collecting and rinsing receptacles at differing relative heights. It will be appreciated that should a small difference in hydrostatic pressure (or head) be maintained between the collecting and rinsing receptacles, cleaning liquid will automatically flow from the collecting receptacle to the final rinsing receptacle. Liquid flow between the collecting and rinsing receptacles will therefore depend on the surface levels of the liquid in each receptacle at a given time, and the porosity of the filter. The flow rate between the receptacles will be dependent on the difference in heights of the free liquid surfaces, if the outlet end of the channel is submerged. Alternatively, if the channel outlet is above the free surface in the receiving receptacle, so that the liquid emerges into the air in the downstream receptacle, the flow rate between the receptacles will be dependent on the height of the free surface above the channel inlet in the upstream receptacle. In FIG. 4, the difference in relative heights of the collecting receptacle and rinsing receptacle is achieved by positioning the base of the rinsing receptacle 14 at a lower height than the base of the collecting receptacle 13. Specifically, the collecting receptacle and the rinsing receptacle are formed within compartments of the same overall height but with a false bottom in each compartment. The height of the false bottom differs between the two receptacles. This arrangement will minimise the total amount of water needed to achieve the head differences. Alternatively, the receptacles could all have the same overall height but no false bottom, and be filled to different levels. It will be appreciated that by fine-tuning the difference in relative vertical heights, the dimensions of the receptacles, the filter properties, the skilled person would readily be able to optimise the volume of liquid that flows from collecting receptacle 13 into the rinsing receptacle 14.

In practice, the differences in free liquid surface levels between the receptacles ought to be kept as low as possible because the total volume of liquid in the cleaning assembly will be the main factor determining the overall weight of the assembly. The need to retain sufficient liquid in each receptacle, to ensure adequate cleaning of the cleaning head, will need to be balanced against the overall weight of the cleaning assembly.

Overall, cleaning assembly 11 provides a means to reduce the degree of recontamination of a desired surface, e.g. a floor, during cleaning. Circulating flow of the cleaning liquid around the cleaning assembly in the presence of the filters ensures the liquid is regularly filtered and at least some, preferably most, particulates are removed.

Three Receptacle Assembly

Figure 5:
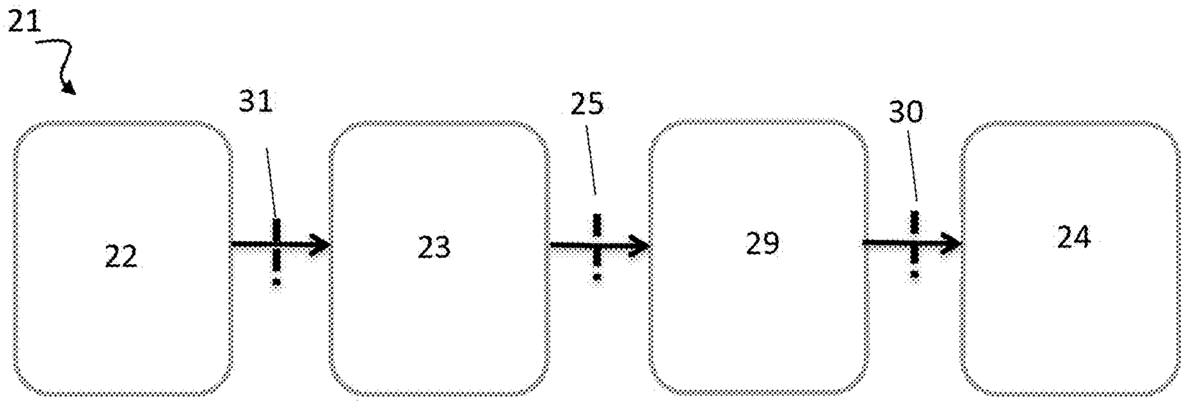
FIG. 5 is a schematic illustrating a preferred embodiment of the cleaning assembly of the present invention comprising the drying mechanism and three receptacles.

In a particularly preferable embodiment of the invention, the cleaning assembly comprises three receptacles. Referring to FIG. 5, there is depicted a cleaning assembly 21, in the form of a mop bucket, according to a preferred embodiment of the present invention. As described herein, the cleaning assembly 21 can vary in size and shape depending on the intended use.

The embodiment in FIG. 5 depicts a cleaning assembly 21 that includes a drying mechanism 22, a collecting receptacle 23, a final rinsing receptacle 24, a filter 25, an intermediate rinsing receptacle 29 and, optionally, two further filters 30; 31.

In FIG. 5, the drying mechanism 22 is fluidly connected to the collecting receptacle 23 in the same way as is described for the embodiment shown in FIG. 2. In addition, optional filter 31 may be positioned such that it is capable of removing at least some, preferably most, of the particulate material from the cleaning liquid that flows from the drying mechanism 22 to the collecting receptacle 23. This could be achieved, for example, by surrounding a wringer or a spinner with a filter such that liquid leaving the drying mechanism has to pass through the filter before entering the collecting receptacle 23.

The cleaning assembly in this embodiment is designed such that liquid can flow from the collecting receptacle 23 to the final rinsing receptacle 24 via the intermediate rinsing receptacle 29. In analogy to the previous embodiments, small differences in the levels of the free surfaces of the cleaning liquid in the three receptacles may be used to promote liquid flow between the receptacles. The collecting receptacle 23 is connected the intermediate rinsing receptacle 29 via a channel (not shown) containing filter 25, which means that liquid can flow from the collecting receptacle 23 to the intermediate rinsing receptacle 29. Filter 25 is positioned such that it is capable of removing at least some, preferably most, of the particulate material from the liquid that flows from the collecting receptacle 23 to the intermediate rinsing receptacle 29. The intermediate rinsing receptacle 29 is also connected to the final rinsing receptacle 24 via a further channel (not shown) containing filter 30, which means that liquid can flow from the intermediate rinsing receptacle 29 to the final rinsing receptacle 24. Filter 30 is positioned such that it is capable of removing at least some, preferably most, of the particulate material from the liquid that flows from the intermediate rinsing receptacle 29 to the final rinsing receptacle 24.

In example operation, the cleaning assembly 21 would be used in a similar manner to that described for the embodiment shown in FIG. 2. However, in contrast to the previously described operation, after cleaning a surface, the cleaning head would not be immediately returned to the final rinsing receptacle 24. Instead, the cleaning head would be inserted into the intermediate rinsing receptacle 29, where it would be rinsed, e.g. by dunking, and agitated by the user to remove at least some, preferably most, of the contaminant matter present on/in the cleaning head. The cleaning head would then be partially dried using drying mechanism 22 before being inserted into the final rinsing receptacle 24 for further rinsing and continuation with the cleaning operation. A full description of the operation is provided below.

The user would begin by adding cleaning liquid, for example, water or water comprising a cleaning agent, such as soap, disinfectant and/or bleach, to the assembly 21. The user would immerse the cleaning head of a cleaning implement into the cleaning liquid in the final rinsing receptacle 24 in order to conduct an initial rinse, or to wet the cleaning head with the cleaning liquid. Alternatively, the cleaning head of the cleaning implement could be immersed in cleaning liquid in the intermediate rinsing receptacle 29 for the initial rinse. However, for ease of description in this embodiment, only insertion into the final rinsing receptacle

24 will be discussed. Next, the cleaning head would have at least some of the liquid wetted into/onto it removed, i.e. it would be partially dried, using drying mechanism 22 (e.g. the cleaning head would be spun, wrung or squeezed). Cleaning liquid removed from the wetted cleaning head would flow into the collecting receptacle 23 via filter 31. The user would then clean, e.g. mop, their desired surface (e.g. a floor) using the cleaning implement.

During the initial cleaning/mopping stage, and subsequent cleaning/mopping operations, the cleaning head would likely become contaminated, and would therefore need to be cleaned, i.e. to have at least some of the contamination removed. The cleaning head of the cleaning implement would therefore be immersed in cleaning liquid in the intermediate rinsing receptacle 29, where it would be rinsed, e.g. by dunking, and agitated by the user to remove at least some, preferably most of, the contaminant matter, present on/in the cleaning head. The cleaning head would become less contaminated as cleaning liquid in the intermediate rinsing receptacle 29 became more contaminated. Further, the cleaning head would retain some of the contaminated liquid from the intermediate rinsing receptacle 29, so would be partially dried using drying mechanism 22. After that, the cleaning head would be rinsed, e.g. by dunking, and agitated by the user in the final rinsing receptacle 24 to further remove at least some, preferably most of, the remaining contaminant matter present on/in the cleaning head and to wet the cleaning head with less contaminated cleaning liquid. The cleaning head would then again be partially dried before its continued use in cleaning the user's desired surface. In general, cleaning liquid in the intermediate rinsing receptacle 29 will become contaminated during the rinsing while cleaning liquid in the final rinsing receptacle 24 will become relatively less contaminated. The operation therefore ensures that the cleaning head as used to clean the surface is relatively non-contaminated, i.e. has been washed clean to an acceptable level.

Throughout the above process, the cleaning head is consistently returned to the intermediate rinsing receptacle 29 to remove the bulk of the contamination it has acquired from cleaning the surface, after which it is dried in drying mechanism 22 to reduce the volume of contaminated liquid present in/on the cleaning head. The cleaning head is then immersed in the cleaning liquid in final rinsing receptacle 24, the least contaminated receptacle, and dried, prior to returning to the surface to be cleaned. Cleaning liquid in the final rinsing receptacle 24 therefore remains relatively uncontaminated because the cleaning head would always be pre-rinsed before being immersed into it. Further, any liquid which flows into the final rinsing receptacle 24 from the intermediate rinsing receptacle 29 is filtered by filter 30, removing at least some, preferably most, of the particulate material present. The intermediate rinsing receptacle 29 meanwhile becomes contaminated during every rinse step due to the rinsing of the cleaning head. However, some of the contaminated liquid will flow out of the intermediate rinsing receptacle 29 into the final rinsing receptacle 24 though filter 30. The intermediate rinsing receptacle 29 will also receive liquid from the collecting receptacle 23, which has been filtered by filter 25. Any contaminants left in the intermediate rinsing receptacle 29 are therefore diluted. Cleaning liquid in the collecting receptacle 23 therefore also becomes contaminated from a combination of drying the cleaning head after the rinsing in the final rinsing receptacle 24 or intermediate rinsing receptacle 29.

An example sequence of actions for a user to clean a surface using a cleaning assembly according to the embodiment shown in FIG. 5 is given below:

1. Immerse the cleaning head of a cleaning implement into cleaning liquid contained in either the final rinsing 24 or intermediate rinsing receptacle 29.
2. Partially dry the cleaning head using the drying mechanism 22.
3. Clean the surface using the cleaning head.
4. Immerse the contaminated cleaning head into the liquid contained within the intermediate rinsing receptacle 29 and rinse while agitating to remove at least some of the contaminants captured by the cleaning head.
5. Partially dry the cleaning head using the drying mechanism 22.
6. Immerse the rinsed cleaning head into the liquid contained within the final rinsing receptacle 24 and agitate to remove at least some of the remaining contaminants captured by the cleaning head and not removed during step 4.
7. Partially dry the cleaning head using the drying mechanism 22.
8. Clean the surface using the cleaning head.
9. Repeat steps 4 to 8 until the whole surface area has been cleaned.

To ensure that the sequence is conducted in the correct order, markings or other indicia may be provided on or in the cleaning assembly to guide the user.

Steps 2 and 7 may be omitted if the user wishes to apply an increased volume of liquid to the surface being cleaned. This may be helpful, for example, in collecting a particularly heavy concentration of detritus.

Use of cleaning assembly 21 is advantageous in that recontamination of a surface being cleaned during cleaning/mopping is drastically reduced compared to use of traditional mopping assemblies comprising only one or two receptacles and a wringer or spinner device. In assembly 21, the final rinsing receptacle remains relatively uncontaminated compared to the collecting and intermediate rinsing receptacles providing a source of relatively clean liquid to be used to clean the desired surface. The liquid flow and the filters also ensure that the intermediate rinsing receptacle, which is used for rinsing the cleaning head, does not become overly contaminated. Further, as the liquid frequently re-enters the collecting receptacle from the drying mechanism, there is a regular movement of the liquid through the assembly, therefore ensuring that regular filtration continually occurs. The flow of filtered liquid into the final rinsing receptacle also ensures that the cleanest liquid is not rapidly depleted, thereby reducing the number of times that cleaning assembly 21 needs to be emptied and refilled when cleaning larger areas.

In a particularly beneficial embodiment of the invention, a pumping mechanism is included to transfer liquid directly back from the final rinsing receptacle 24 to the collecting receptacle 23. This enables a circulating liquid flow within the assembly. The consistent movement of cleaning liquid in the presence of the filters ensures that the liquid is frequently filtered and further particulates are removed.

Figure 6:
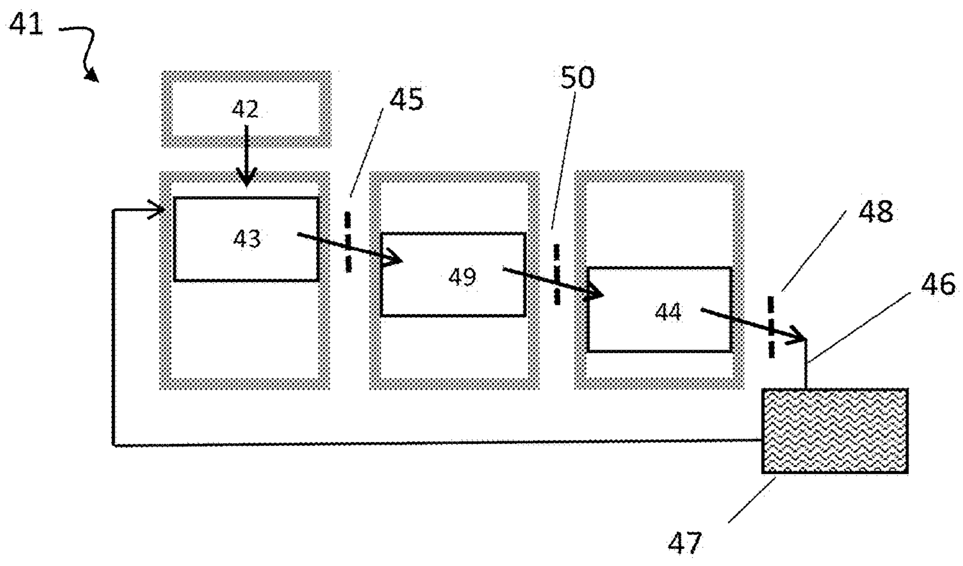
FIG. 6 is a schematic illustrating the liquid flow in a preferred embodiment of the cleaning assembly of the present invention comprising a drying mechanism, three receptacles and pumping mechanism which enables a circulating liquid flow.

FIG. 6 shows a preferred embodiment of the present invention where there is a circulating liquid flow within a cleaning assembly 41. Cleaning assembly 41 comprises drying mechanism 42, a collecting receptacle 43, a final rinsing receptacle 44, an intermediate rinsing receptacle 49, filters 45, 48 and 50, a pumping channel 46 and a pump 47. The cleaning assembly is arranged as described for the embodiment shown in FIG. 4, except that the intermediate rinsing receptacle 49 is located in between the first and final rinsing receptacles 43, 44, such that cleaning liquid flows from the collecting receptacle 43 to the final rinsing receptacle 44 via the intermediate rinsing receptacle 49. A filter 45, 48 or 50 is located within the connecting channels between any of the three receptacles. As described in relation to FIG. 4, a circulating flow of liquid is achieved by forcing the liquid to flow from the final rinsing receptacle 44 to the collecting receptacle 43 using a pump 47. The relative position of the three receptacles also shows how differences in the levels of the free surfaces of the cleaning liquid can be achieved by positioning the three receptacles at differing relative heights. The filters 45, 48 and 50 may be removable filters. The filters may also be coupled with simple valves.

Arrangement of the Receptacles

Figure 7:
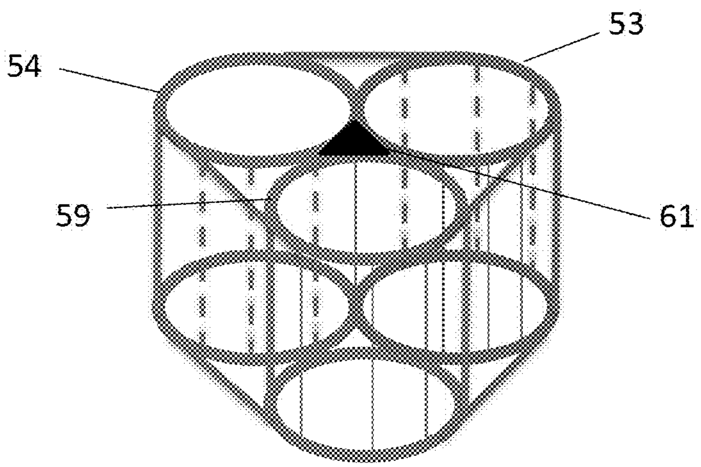
FIG. 7 shows one arrangement of the receptacles in a preferred embodiment of the cleaning assembly of the present invention comprising three receptacles.
Figure 8:
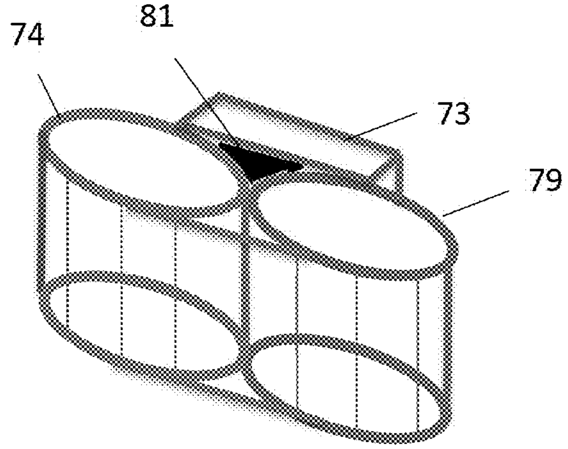
FIG. 8 shows another arrangement of the receptacles in a preferred embodiment of the cleaning assembly of the present invention comprising three receptacles.

As will be appreciated, several designs, including rectilinear (in-line) and triangular arrangements, of three receptacles are possible. FIGS. 7 and 8 show embodiments of the present invention based on two possible triangular arrangements of the collecting (53 & 73), final rinsing (54 & 74) and intermediate rinsing (59 & 79) receptacles. Placing the three receptacles in a triangular fashion has both aesthetic and practical advantages. For example, it seems likely that this arrangement would be more attractive visually and it would offer greater stability to reduce the chance of accidental spillage. Further, channels connecting the three receptacles could be located centrally, preferably within a single central unit or filter block. The receptacles could be separate from each other but it is preferred if they form compartments of the same overall bucket.

Filter Block

In the embodiments of the invention shown in FIGS. 7 and 8, the invention comprises a single, centralised filter block 61 & 81. Filter block 61/81 is housed between the three receptacles and ensures that the filters can be conveniently located in one place for ease of manufacture and cleaning operations. In further embodiments, the filter block is removable, enabling contaminated filters to be removed and washed clean. In contrast, with the alternative in-line arrangement of the receptacles, the filters may need to be located separately and, possibly, one or more of the channels may be moulded into the walls of the cleaning assembly itself.

Figure 9:
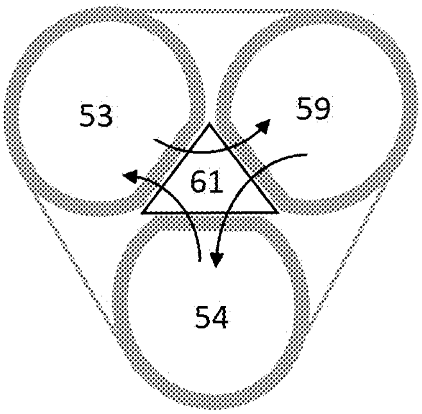
FIG. 9 is a schematic illustrating the liquid flow through a centralised filter block in an embodiment of the cleaning assembly of the present invention comprising three receptacles and displaying a circulating liquid flow.
Figure 10:
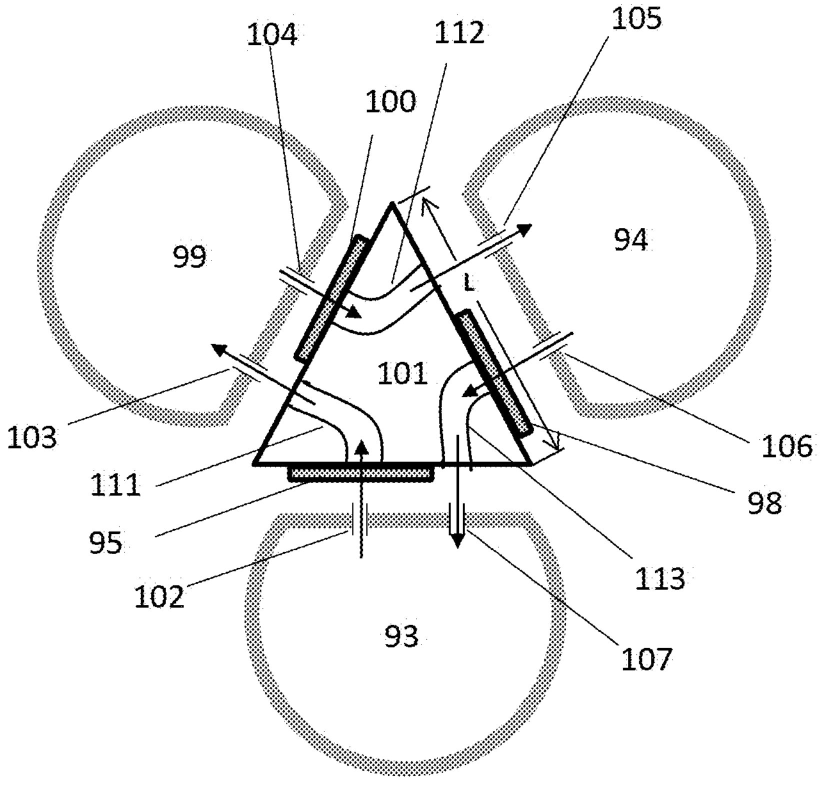
FIG. 10 is a schematic illustrating the liquid flow through ducts in a filter block for preferred embodiments of the cleaning assembly of the present invention.

FIG. 9 shows the flow of liquid though the centralised filter block in a triangular arrangement of the three receptacles for the embodiment shown in FIG. 7. The liquid travel is shown via arrows. The filter block 61 shown is triangular but may otherwise be designed to fit in the recess between the three receptacles. As can be seen, the filter block is configured to allow the liquid to flow from the collecting receptacle 53 to the intermediate rinsing receptacle 59, the intermediate rinsing receptacle 59 to the final rinsing receptacle 54, and the final rinsing receptacle 54 to the collecting receptacle 53. This allows the liquid to be filtered at all stages of the circulating flow. Further details of the filter block are shown in FIG. 10. As described in relation to the embodiments shown in FIGS. 6, liquid will automatically flow from the collecting receptacle 53 to the intermediate rinsing receptacle 59, via filter block 61, if a small difference in pressure ("hydrostatic head difference") is maintained. In practice, this difference in pressure level of the two free surfaces (the hydrostatic head difference) should be relatively easy to achieve, whether the outlet end of the connecting duct is submerged or not. Similarly, a small pressure difference between the intermediate rinsing receptacle 59 and the final rinsing receptacle 54 will produce a flow (essentially because of gravity) into the final rinsing receptacle 54, via filter block 61. The flow between the three receptacles will depend on the level of the free liquid surface in each receptacle at a given time, the cross-sectional areas of any connecting channels and the porosity of the filters in the filter block. It is intended that flow will be maintained whether the channel discharges above the free surface of the liquid in the receiving receptacle, or lies beneath that free surface of the liquid. The flow from the final rinsing receptacle 54 to the collecting receptacle 53, via filter block 61, requires a pumping mechanism.

Referring to FIG. 10, there is depicted the structure of a filter block 101 for use in a preferred embodiment of the present invention, viewed from above. FIG. 10 depicts a filter block 101 connected to a collecting receptacle 93, a final rinsing receptacle 94, a intermediate rinsing receptacle 99. Filter block 101 is shown here, by way of example, as a triangular prism in shape. Filters 95, 98 and 100 are located on the outer surfaces of the filter block or, alternatively, may be located within the body of the filter block 101. The filters are aligned with channels (102, 104, 106), leading from each receptacle. The filters are preferably removable, and will be located in specific slots or housings. Behind each filter is a duct (111, 112 & 113) leading through the filter block into the next receptacle. The end of each duct aligns with a channel leading into the receptacle (103, 105, 107). In alternative embodiments where the filters are contained within the body of the filter block rather than on the outside, it will be appreciated that multiple ducts would be needed to connect each pair of receptacles, i.e. a duct from the receptacle leading to the filter and a duct from the filter into the next receptacle.

In FIG. 10, the arrows indicate the flow of the liquid through the assembly. Liquid from the collecting receptacle 93 flows through channel 102 to filter block 101. The liquid goes through filter 95 and along duct 111 and enters the intermediate rinsing receptacle 99 via channel 103. In an analogous manner, liquid from the intermediate rinsing receptacle 99 flows to the final rinsing receptacle 94 via filter 100, duct 112 and channels 104 & 105. Lastly, liquid is pumped back from the final rinsing receptacle 94 to the collecting receptacle 93 via filter 98, duct 113 and channels 106 & 107. It will be appreciated that the size of the filter block will determine the maximum cross-sectional area of the connecting ducts, which can be accommodated, and hence the flow rates between the three receptacles. The flow rate should be high enough for the liquid in each receptacle to remain clean, thereby helping to ensure that the cleaning head is exposed only to liquid with the lowest levels of contamination. The flow rates between the receptacles will be a function of the relative heights of the levels of the liquid i.e. the free surfaces in the connected receptacles, together with the filter characteristics i.e. their porosity and flow area. The actual cross-sectional shape for the ducts will be dictated by the requirement to accommodate multiple ducts within the block and the need to achieve sufficiently high flow rates. For the simple triangular cross-section of filter block depicted in FIG. 10, the cross-sectional area and length of the connecting ducts will be defined by the dimension L. It is envisaged that the ducts may be machined or cast into the filter block. Injection moulding of a suitably hard plastic, e.g. ABS, would likely offer much greater manufacturing flexibility than machining a solid material, such as metal (e.g. aluminium) or rigid plastic, enabling efficient curved wall channels to be cast into the filter block with significant increases in the liquid flow rates.

The filter block sits within the cleaning assembly such that the ducts (111, 112 & 113) in the filter block always align accurately with the channels (102 to 107) into and out of the three receptacles. The filter block itself can be removed for ease of cleaning. In preferred embodiments, the cleaning assembly or the filter block, or both, comprise grooves, recesses or guide rails to allow accurate positioning of the filter block.

It will be appreciated that FIG. 10 shows a triangular prism shaped filter block viewed from above. As a result, the entrance and exits of the ducts (111, 112 & 113), along with the various filters, may not lie in the same plane. This variation in height of the connecting ducts can be seen in FIGS. 11 and 12.

Figure 11:
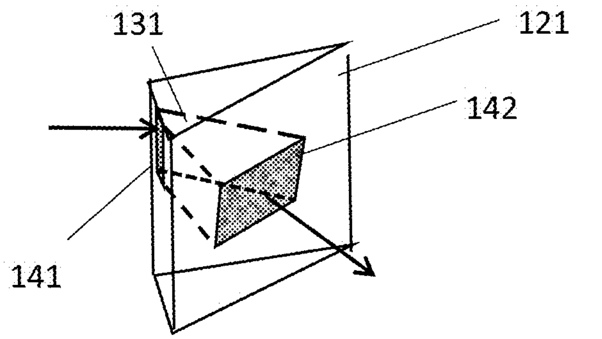
FIG. 11 is a perspective view of a filter block for use in preferred embodiments of the cleaning assembly of the present invention illustrating a potential positioning of one internal duct.

FIG. 11 illustrates a perspective view of a filter block 121 for use in a preferred embodiment of the present invention. FIG. 11 shows one internal duct 131 with entrance 141 and exit 142. The arrows in FIG. 11 indicate liquid flow. For clarity, the filters and the other ducts present on/in the filter block are not shown. During operation, cleaning liquid flowing from the collecting receptacle (not shown) would enter duct 131 via entrance 141 and would leave via exit 142 to enter the intermediate rinsing receptacle (not shown). A filter (not shown) would typically be located between the collecting receptacle and entrance 141. Duct 131 is shown in a simplified form with straight lines representing each corner. In practice, however, all sharp corners and edges will need to be removed to maximise liquid flow rates and to avoid stress-raising in the materials, whether this be metal or plastic. It is well-known that sharp corners and edges in flow channels help to increase flow losses, so the ducts should be designed to yield the maximum flow rates between the receptacles for given surface levels. Each channel will be inclined slightly downwards towards its exit (i.e. its outlet plane).

Figure 12:
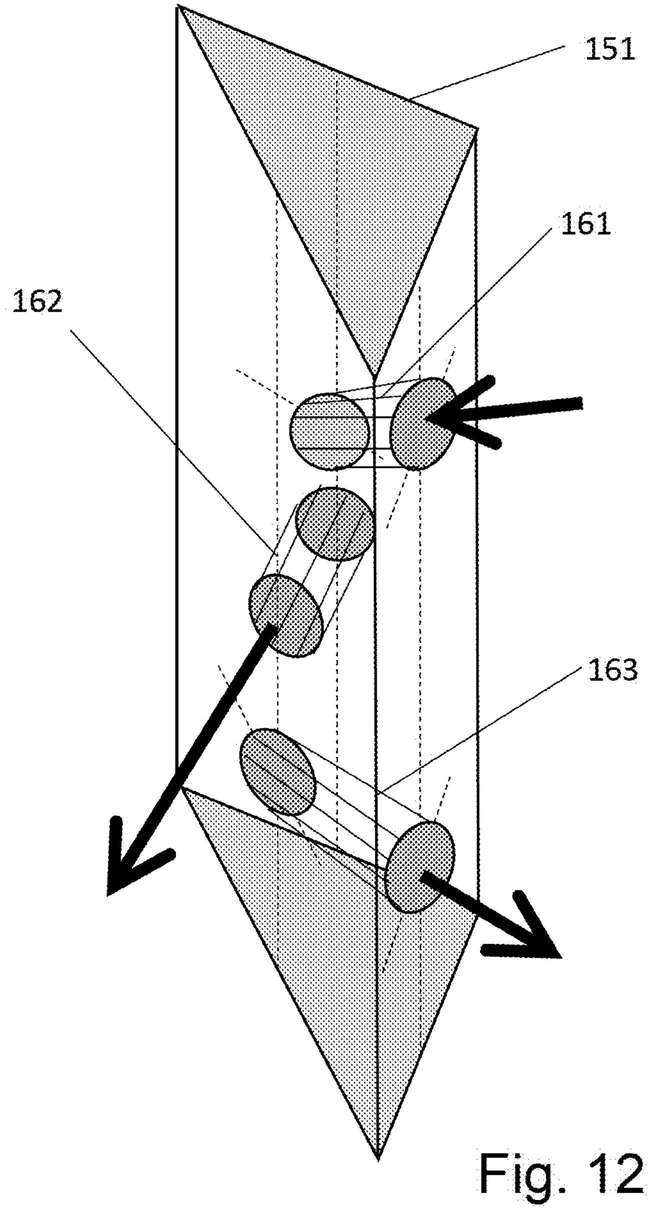
FIG. 12 is a perspective view of an alternative filter block for use in preferred embodiments of the cleaning assembly of the present invention illustrating the potential positioning of three internal ducts.

FIG. 12 illustrates a perspective view of a filter block 151 for use in a preferred embodiment of the present invention comprising three receptacles that are arranged in a triangular arrangement. FIG. 12 shows the three internal ducts 161, 162 & 163. Arrows indicate liquid flow. The filters present on/in the filter block are not shown. During operation, cleaning liquid flowing from the collecting receptacle (not shown) would travel to the intermediate rinsing receptacle (not shown) via duct 161. A filter (not shown) would typically be located between the collecting receptacle and the entrance to duct 161. Cleaning liquid would also flow from the intermediate rinsing receptacle (not shown) to the final rinsing receptacle (not shown) via duct 162. Similarly, a filter (not shown) would typically be located between the intermediate rinsing receptacle and the entrance to duct 162. Finally, cleaning liquid would be pumped from one level to a higher level so as to transfer liquid back from the final rinsing receptacle (not shown) to the intermediate rinsing receptacle (not shown) via duct 163.

It will be appreciated that while it has been described that the filters would be located prior to each duct, filters could equally be placed in the middle or close to the exits of the ducts.

In addition to the filters, the filter block may also comprise sliding plate valves to allow the user to restrict or shut-off the flow of liquid into the filter block. These valves are preferably housed in the same locations or housings as the filters. The valves may be used to restrict the flow of the cleaning fluid in order to control the level of the cleaning fluid in each receptacle. They could also be used to stop the flow while a filter is being removed for cleaning. In alternative embodiments, the valves could also be located in or adjacent to the channels of the cleaning assembly rather than on the filter block. This would allow the liquid flow to be stopped while the entire filter block is removed for cleaning.

Drying Mechanism

In preferred embodiments of the present invention, the cleaning assembly comprises a more complex drying mechanism than a traditional wringer device. In particular, the drying mechanism may comprises a powered spinner mechanism, e.g. a "cyclone", or another mechanism. Such a spinner mechanism may comprise a compartment with slatted sides that is able to rotate freely. Rotation of the compartment may be driven through a motor, which may be electrically powered or through a mechanical assembly linked to a pedal. If the latter, the pedal is preferably incorporated into the cleaning assembly and allows the user to power the spinner using their foot while holding the cleaning head of the cleaning implement in the spinner compartment. It is particularly advantageous if the cleaning head is configured to rotate independently of the rest of the cleaning implement, namely the elongate rod/body/handle, which would be held by the user.

During operation, the user places the cleaning head in the spinner compartment and pumps the foot pedal to spin the compartment. It will be appreciated that various gearing mechanisms could be used to ensure the spinner rotates at a suitable speed. Cleaning liquid extracted from the cleaning head is expelled through the slatted sides of the cyclone and enters the collecting receptacle.

In general, the drying mechanism may be separate from the collecting receptacle or may be integrated with the collecting receptacle. In embodiments, the collecting receptacle encloses the drying mechanism on all sides except the top, which allows the cleaning head to be inserted and then removed.

Mechanical System for Pumping

The pumping mechanism used to produce a circulating liquid flow within the cleaning assembly may be any pumping mechanism known in the art.

In embodiments, the pumping mechanism is electrically powered and may be activated by a liquid level switch. If present, the liquid level switch detects when the liquid in a particular receptacle is too low or too high and activates or deactivates the pumping mechanism to start or stop the movement of liquid around the assembly.

In preferred embodiments of the invention, the pumping mechanism is mechanically powered and driven by a movement made by the user, e.g. a foot pedal. In particularly preferred embodiments, the pumping mechanism is driven by the same mechanism used to power the drying mechanism (e.g. spinner device). This is preferably a foot pedal incorporated into the cleaning assembly. Linkage of these two mechanisms allows the user to pump liquid around the assembly, thereby resulting in increased filtration and removal of a fraction of the contaminants, while also partially drying the cleaning head. As the cleaning head is regularly dried, at least partially, during the cleaning/mopping process, regular re-circulation of the liquid within the assembly is achieved.

Filter Performance

The number of filters to be included in the cleaning assembly is an important consideration because a single filter will never capture all of the particulates. It will always allow a small fraction of the particulate load to pass through.

In mechanical design, filter performance is most conveniently expressed in terms of "the efficiency", defined by the expression below $$\text{Filter efficiency } \eta = \frac{\text{amount of contamination removed}}{\text{incoming amount of contamination}} = \text{particulate } \left[(\text{mass}_{in} - \text{mass}_{out})/(\text{mass}_{in})\right]$$

Mathematically, this can be expressed by equation 1 below:

$$\eta = 1 - (m_{out}/m_{in}) \qquad \text{Equation 1}$$

It will be appreciated that the efficiency n of a filter depends strongly on the size of the particles carried by the flow, although other parameters, such as the particle concentration and the flow rate, may also have an influence. Using a conservative but typical value for this efficiency (of separation), a filter with an efficiency of 0.7 (70%) would be expected to remove 70% of the contamination from the liquid flow at inlet. Similarly, placing a second filter downstream (or "in series") would remove a further 70% of the remaining "particulate load". In other words, only 9% of the original amount of contamination would be left after the cleaning liquid passed through two filters in series. For the cleaning assembly comprising three filters in series, the combination should ensure that only 2.7% of the original particulate content would remain. This contamination can then be further reduced by circulating the liquid around the assembly again. Each time the liquids passes through a filter, 70% of the contaminants will be removed.

A practical arrangement will typically use filters with different porosities in series, so as to give the best overall performance. For example, the first filter will be intended to capture the largest particles, such as hairs and fluff. The next filter will have a finer mesh, i.e. lower porosity, and will be used to capture most of the remaining particles. The last filter will capture very fine particles that would otherwise continue to accumulate in the final rinsing receptacle. This arrangement provides a form of protection for the last filter, in particular, which would otherwise become blocked with large particles. The series arrangement therefore enables all particles, including very small dust particles, to be collected.

The properties of the filters are also an important consideration. The flow rates of the cleaning liquid will depend on the porosity, pressure loss coefficients, and the effective area presented to the flow, of each filter.

Reduction in Cleaning Head Size

It will be appreciated that for a new cleaning assembly, in the form of a mop bucket, intended for domestic use, it will likely be advantageous that any increases in the overall size and weight of the new assembly compared to typical mopping assemblies should be kept to a minimum.

Figure 13:
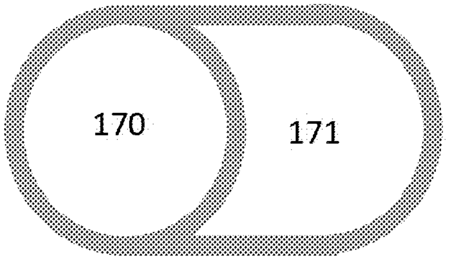
FIG. 13 is a schematic illustrating the cross-sectional area of a prior art cleaning assembly.

The overall weight of the cleaning assembly when containing the amount of cleaning liquid needed in a cleaning process will principally be determined by its cross-section. This cross-section, in turn, depends on the area required to accommodate the cleaning head. FIG. 13 shows this footprint (area in plan-view) for a common, prior art mop bucket. FIG. 13 shows a cyclone section 170 that lies partially above, and drains into, the overall bucket. Due to the presence of cyclone section 170, the accessible space which the mop head can be inserted into for rinsing is defined by section 171. Viewing FIG. 13, it will be appreciated that when designing a cleaning assembly with multiple receptacles (e.g. three receptacles), some reduction in the size of the cleaning head might be advantageous if trying to keep the overall size and weight to a minimum.

It will be appreciated that numerous modifications to the above described cleaning assembly and method of cleaning may be made without departing from the spirit and scope of the invention, for instance, the scope of the invention as defined in the appended claims are possible. Moreover, any one or more of the above-described features could be combined with any one or more other such features, and that all such combinations are intended within the present disclosure.

Optional and/or preferred features may be used in other combinations beyond those explicitly described herein and optional and/or preferred features described in relation to one aspect of the invention may also be present in another aspect of the invention, where appropriate.

The invention claimed is:

1. A mop bucket for use in domestic applications with a cleaning liquid, comprising:
- a drying mechanism;
- a collecting receptacle, for receipt of the cleaning liquid, fluidly connected to the drying mechanism; and
- a rinsing receptacle, also for receipt of the cleaning liquid, fluidly connected to the collecting receptacle via a first filter,
- wherein the collecting receptacle is positioned relative to the rinsing receptacle so as to promote flow of the cleaning liquid from the collecting receptacle to the rinsing receptacle through the first filter;
- further comprising a pumping mechanism and a channel comprising a second filter,
- wherein the channel fluidly connects the rinsing receptacle to the collecting receptacle, and the pumping mechanism pumps cleaning liquid from the rinsing receptacle to the collecting receptacle through the channel containing the second filter, thereby enabling circulating liquid flow within the mop bucket; and
- further comprising a filter block, wherein the first and second filters are housed in the filter block and wherein the filter block is removable from the mop bucket.

2. The mop bucket of claim 1 further comprising one or more intermediate rinsing receptacles, fluidly connected between the collecting receptacle and the rinsing receptacle, whereby the one or more intermediate rinsing receptacles are fluidly connected to the collecting receptacle via the first filter; and wherein the mop bucket further comprises a third filter, wherein the one or more intermediate rinsing receptacles are fluidly connected to the rinsing receptacle via the third filter.

3. The mop bucket of claim 1 wherein fluid connection of two receptacles is by means of a channel containing the first filter.

4. The mop bucket of claim 1 further comprising an electric motor, wherein the pumping mechanism is controlled by the electric motor.

5. The mop bucket of claim 1 further comprising a foot pedal, wherein the pumping mechanism is configured to be driven by the foot pedal.

6. The mop bucket of claim 5 wherein the drying mechanism is an externally driven drying mechanism that is also configured to be driven by the foot pedal.

7. The mop bucket of claim 1 wherein the filter block comprises internal ducts to direct the flow of cleaning liquid between receptacles.

8. The mop bucket of claim 1 further comprising at least one valve configured to restrict the flow of cleaning liquid within the mop bucket.

9. The mop bucket of claim 8 wherein the at least one valve is located in the filter block.

10. The mop bucket of claim 1 wherein at least one of the filters is selected from a membrane filter, a charcoal filter, a biological filter, or a combination of any one or more of these.

11. The mop bucket of claim 1 wherein the collecting receptacle is at least partially arranged at a greater height than the rinsing receptacle when the mop bucket is in a vertical orientation of normal use.

12. The mop bucket of claim 2 wherein the collecting receptacle is at least partially arranged at a greater height than the one or more intermediate rinsing receptacles, and the one or more intermediate rinsing receptacles are at least partially arranged at a greater height than the rinsing receptacle, all when the mop bucket is in a vertical orientation of normal use.

13. The mop bucket of claim 1 wherein the drying mechanism is positioned so as to be in register with the collecting receptacle in a vertical orientation.

14. The mop bucket of claim 1 wherein the drying mechanism and the collecting receptacle are integrated as a single component.

15. The mop bucket of claim 1 further comprising a filter between the drying mechanism and the collecting receptacle.

16. A method of cleaning using the mop bucket of claim 1, the method comprising the steps of:

(i) providing a cleaning implement, comprising a cleaning head, for use with the mop bucket;

(ii) adding a cleaning liquid to at least one receptacle of the receptacles of the mop bucket;

(iii) immersing the cleaning head of the cleaning implement in the cleaning liquid in the (iii at least one receptacle;

(iv) removing at least some of the cleaning liquid wetted into/onto the cleaning head using the drying mechanism;

(v) cleaning a surface with the cleaning head; and (vi) repeating the steps (iii) to (v) until satisfactory cleaning of the surface has been achieved.

17. The method of cleaning of claim 16, wherein the mop bucket comprises one or more intermediate rinsing receptacles, fluidly connected between the collecting receptacle and the rinsing receptacles, whereby the one or more intermediate rinsing receptacles are fluidly connected to the collecting receptacle via the first filter and is/are fluidly connected to the rinsing receptacle, and the method comprises the steps of:

(i) providing a cleaning implement, comprising a cleaning head, for use with the mop bucket;

(ii) adding a cleaning liquid to at least one receptacle of the receptacles of the mop bucket;

(iii) immersing the cleaning head of the cleaning implement in the cleaning liquid in the at least one receptacle of the receptacles;

(iv) removing at least some of the cleaning liquid wetted into/onto the cleaning head using the drying mechanism;

(v) cleaning a surface with the cleaning head;

(vi) immersing the cleaning head of the cleaning implement in the cleaning liquid in an intermediate rinsing receptacle;

(vii) removing at least some of the cleaning liquid wetted into/onto the cleaning head using the drying mechanism; and (viii) repeating the steps (iii) to (vii) until satisfactory cleaning of the surface has been achieved.

18. The method of cleaning according to claim 16, wherein the pumping mechanism of the mop bucket is configured to be driven by a foot pedal, the method further comprising the step of applying pressure to the foot pedal to enable circulating liquid flow within the mop bucket.

19. The mop bucket of claim 1 further comprising at least one valve configured to restrict the flow of cleaning liquid within the mop bucket to restrict the flow of cleaning liquid from the collecting receptacle to the rinsing receptacle.

* * * * *